US011915861B2

(12) United States Patent
Kim et al.

(10) Patent No.: US 11,915,861 B2
(45) Date of Patent: Feb. 27, 2024

(54) METHOD FOR MANUFACTURING RARE EARTH PERMANENT MAGNET

(71) Applicant: STAR GROUP IND. CO., LTD, Daegu (KR)

(72) Inventors: Dong Hwan Kim, Daegu (KR); Koon Seung Kong, Daegu (KR)

(73) Assignee: STAR GROUP IND. CO., LTD, Daegu (KR)

( * ) Notice: Subject to any disclaimer, the term of this patent is extended or adjusted under 35 U.S.C. 154(b) by 802 days.

(21) Appl. No.: 16/975,886

(22) PCT Filed: Sep. 13, 2018

(86) PCT No.: PCT/KR2018/010755
§ 371 (c)(1),
(2) Date: Aug. 26, 2020

(87) PCT Pub. No.: WO2019/212101
PCT Pub. Date: Nov. 7, 2019

(65) Prior Publication Data
US 2021/0005380 A1    Jan. 7, 2021

(30) Foreign Application Priority Data
Apr. 30, 2018   (KR) .................. 10-2018-0050000

(51) Int. Cl.
*H01F 41/02* (2006.01)
*B22F 3/16* (2006.01)
(Continued)

(52) U.S. Cl.
CPC ............ *H01F 41/0293* (2013.01); *B22F 3/16* (2013.01); *B22F 3/24* (2013.01); *B22F 9/04* (2013.01);
(Continued)

(58) Field of Classification Search
CPC .......... H01F 41/0293; B22F 3/16; B22F 3/24; B22F 9/04; B22F 2003/248;
(Continued)

(56) References Cited

U.S. PATENT DOCUMENTS 4,762,574 A * 8/1988 Ghandehari .......... H01F 1/0577
419/12
10,867,727 B2 * 12/2020 Dong ...................... B22F 9/023
2010/0129538 A1 * 5/2010 Kunieda ............. C22C 33/0278
427/127

FOREIGN PATENT DOCUMENTS

JP      01-117303 A      5/1989
JP      2008-172037 A    7/2008
(Continued)

OTHER PUBLICATIONS

Kim Dong Hwan et.al. [KR20180038745A] (Machine translation for the text reference) (Year: 2018).*
(Continued)

*Primary Examiner* — Sally A Merkling
*Assistant Examiner* — Nazmun Nahar Shams
(74) *Attorney, Agent, or Firm* — NKL Law; Jae Youn Kim (57) ABSTRACT

There is provided a method for manufacturing a rare earth sintered magnet having a stable magnetic performance, by uniformly distributing a heavy rear earth element to the surface of the magnet and the grain boundary inside of the magnet by using a mixture of a heavy rare earth compound or a heavy rare earth metal alloy and a rare earth magnet powder, to lower a decrease rate of the magnetic characteristics based on the temperature of the rare earth sintered magnet.

1 Claim, 1 Drawing Sheet

(51) Int. Cl.
*B22F 3/24* (2006.01)
*B22F 9/04* (2006.01)
*C22C 38/00* (2006.01)
*H02K 1/02* (2006.01)

(52) U.S. Cl.
CPC ...... *C22C 38/005* (2013.01); *B22F 2003/248* (2013.01); *B22F 2009/044* (2013.01); *B22F 2201/10* (2013.01); *B22F 2201/20* (2013.01); *B22F 2202/05* (2013.01); *B22F 2301/355* (2013.01); *B22F 2304/10* (2013.01); *C22C 2202/02* (2013.01); *H02K 1/02* (2013.01)

(58) Field of Classification Search
CPC ............ B22F 2009/044; B22F 2201/10; B22F 2201/20; B22F 2202/05; B22F 2301/355; B22F 2304/10; C22C 38/005; C22C 2202/02
See application file for complete search history.

(56) References Cited

FOREIGN PATENT DOCUMENTS

| JP | 2010-027852 A | 2/2010 |
| JP | 2018-504769 A | 2/2018 |
| JP | 6281987 B2 | 2/2018 |
| KR | 10-1447301 B1 | 10/2014 |
| KR | 10-2018-0038745 A | 4/2018 |

OTHER PUBLICATIONS

Fujita et al, "Magnetic Properties and Corrosion Characteristics of Nd-(Fe,Co,Ni)-B Pseudo-Ternary Systems", IEEE Translation Journal on Magnetics in Japan, Mar. 1991, vol. 6, No. 3.

* cited by examiner

METHOD FOR MANUFACTURING RARE EARTH PERMANENT MAGNET

TECHNICAL FIELD

The present invention relates to a method for manufacturing a rare earth sintered magnet, and more particularly, to a method for manufacturing a rare earth sintered magnet, by uniformly distributing a heavy rare earth element(s) from a mixture of a heavy rare earth compound or heavy rare earth metal alloy and a rare earth magnet powder to the surface of the magnet and a grain boundary inside the magnet to lower a decrease rate of the magnetic characteristics based on the temperature of the rare earth sintered magnet, to improve the temperature coefficient of residual magnetic flux density and the coercivity which are magnetic characteristics based on temperature.

BACKGROUND ART

As the demand of a sintered NdFeB magnet used for motors like hybrid vehicles, etc., has increasingly expanded, the sintered NdFeB magnet is required to have higher coercivity (Hcj). To increase the coercivity (Hcj) of the sintered NdFeB magnet, a method is known to substitute a part of Nd with Dy or Tb. However, there are problems in that the resource of Dy or Tb is not easily available or is ununiformly distributed and the residual magnetic flux density (Br) or the maximum energy product ((BH)max) of the sintered NdFeB magnet decreases by the substitution of these elements.

It has been recently found that the coercivity (Hcj) of a sintered NdFeB magnet can be increased, almost without decreasing the residual magnetic flux density (Br) of the sintered NdFeB magnet, by adhering Dy or Tb to the surface of the sintered NdFeB magnet by a sputtering process and heating it at 700~1000° C. (Non-Patent Documents 1~3).

The Dy or Tb adhered to the sintered NdFeB magnet is sent to the inside of a sintered compact through the grain boundary of the sintered compact and diffuses from the grain boundary into each particle of a main phase, $R_2Fe_{14}B$ (where R is a rare earth element) (grain boundary diffusion). Since R-rich phase of the grain boundary is liquefied by heating, the diffusion rate of Dy or Tb in the grain boundary is much faster than the diffusion rate from the grain boundary to the inside of the main phase particle.

The difference in diffusion rate is used to adjust the heat treatment temperature and time, thereby realizing over the entire sintered compact, a state that the concentration of Dy or Tb is high only in the area (surface area) which is very close to the grain boundary of the main phase particle in the sintered compact. Since the coercivity (Hcj) of the sintered NdFeB magnet is determined depending on the state of the surface area of the main phase particle, the sintered NdFeB magnet having a crystal grain with a high concentration of Dy or Tb in the surface area has high coercivity. Further, although the residual magnetic flux density (Br) drops when the concentration of Dy or Tb increases, the residual magnetic flux density (Br) of the entire main phase particle essentially does not drop since such an area where the decrease in Br occurs is only the surface area of each main phase particle. Thus, it is possible to manufacture a high performance magnet having high coercivity (Hcj) and having the residual magnetic flux density (Br) not so different from the sintered NdFeB magnet which is not substituted with Dy or Tb. This technique is called a grain boundary diffusion method.

Methods for industrially manufacturing a sintered NdFeB magnet by the grain boundary diffusion method have been already published. One method includes forming a fine powdered layer of a fluoride or oxide of Dy or Tb on the surface of a sintered NdFeB magnet and heating it. Another method includes burying a sintered NdFeB magnet in a mixed powder composed of the powder of a fluoride or oxide of Dy or Tb and the powder of calcium hydride and heating it. (Non-Patent Documents 4 and 5).

When a part of Fe in a sintered NdFeB magnet is substituted with Ni or Co, the corrosion resistance of the magnet improves. If the total substitution percentage of Ni and Co is higher than 20~30%, the occurrence of rust does not show in the corrosion resistance test (temperature of 70° C., humidity of 95%, 48 hours). (Non-Patent Document 6).

However, when a large amount of Ni and Co is contained, it increases the price of the magnet and it is difficult to industrially use a sintered NdFeB magnet manufactured by this method.

The relevant techniques, which were proposed before the above-described grain boundary diffusion method was publicly known, include the technique of diffusing at least one of the elements, Tb, Dy, Al and Ga, in the proximity of the surface of a sintered NdFeB magnet to suppress the high temperature demagnetization (Patent Document 1) or the technique of coating the surface of a sintered NdFeB magnet with at least one of the elements, Nd, Pr, Dy, Ho and Tb, to prevent the deterioration of the magnetic characteristics due to processing deterioration (Patent Document 2).

There is a need to improve the coercivity by suppressing the high temperature demagnetization by diffusing at least one of the elements, Tb, Dy, Al and Ga, in the proximity of the surface of a sintered NdFeB magnet.

PRIOR ART DOCUMENTS

Patent Documents

[Patent Document 1] Japanese Unexamined Patent Application Publication No. H01-117303
[Patent Document 2] Japanese Unexamined Patent Application Publication No. S62-074048
[Patent Document 3] Korean Registered Patent No. 10-1447301

Non-Patent Documents

[Non-Patent Document 1] K T Park et al, "Effect of Metal-Coating and Consecutive Heat Treatment on Coercivity of Thin Nd—Fe—B Sintered magnets", Proceedings of the Sixteenth International Workshop on Rare-Earth Magnets and their Applications (2000), pp 257-264

[Non-Patent Document 2] Naoyuki Ishigaki et al, "Surface Modification and Characteristics Improvement of Micro-sized Neodymium Sintered Magnet", NEOMAX Technical Report, published by kabushiki Kaisha NEOMAX, vol 15 (2005), pp 15-19

[Non-Patent Document 3] Ken-ichi Machida et al, "Grain Boundary Modification and Magnetic Characteristics of Sintered NdFeB Magnet", Speech Summaries of 2004 Spring Meeting of Japan Society of Powder and Powder Metallurgy, published by the Japan Society of Powder and Powder Metallurgy, 1-47A

[Non-Patent Document 4] Kouichi Hirota et al, "Increase in Coercivity of Sintered NdFeB Magnet by Grain Boundary Diffusion Method", Speech Summaries of 2005 Spring Meeting of Japan Society of Powder and Powder Metallurgy, published by the Japan Society of Powder and Powder Metallurgy, p 143

[Non-Patent Document 5] Ken-ichi Machida et al, "Magnetic Characteristics of Sintered NdFeB Magnet with Modified Grain Boundary", Speech Summaries of 2005 Spring Meeting of Japan Society of Powder and Powder Metallurgy, published by the Japan Society of Powder and Powder Metallurgy, p 144

[Non-Patent Document 6] Yasutaka Fukuda et al, "Magnetic Properties and Corrosion Characteristics of Nd—(Fe, Co,Ni)—B Pseudo-Ternary Systems", Kawasaki Steel Technical Report, published by Kawasaki Steel Corporation, vol 21(1989), No 4, pp 312-315

DISCLOSURE

Technical Problem

Therefore, it is an object of the present invention to solve the above problems and to provide a method for manufacturing a rare earth sintered magnet, by uniformly distributing a heavy rare earth element(s) from a mixture of a heavy rare earth compound or heavy rare earth metal alloy and a rare earth magnet powder to the surface of the magnet and a grain boundary inside the magnet to lower a decrease rate of the magnetic characteristics based on the temperature of the rare earth sintered magnet, to improve the temperature coefficient of residual magnetic flux density and the coercivity which are magnetic characteristics according to a temperature of an Nd—Fe—B sintered magnet.

Technical Solution

The present invention provides a method for manufacturing a rare earth sintered magnet comprising the steps:
preparing a rare earth alloy composed of xwt % RE-ywt % B-zwt % TM-bal.wt % Fe (wherein RE is a rare earth element, TM is a 3d transition element, x=28~35, y=0.5~1.5 and z=0~15) and pulverizing the prepared alloy to a size of 1.0~5.0 μm;
preparing a heavy rare earth compound or a heavy rare earth metal alloy and pulverizing the heavy rare earth compound or heavy rare earth metal alloy to a size of 1.0~5.0 μm;
mulling the pulverized rare earth alloy powder and the heavy rare earth compound powder or heavy rare earth metal alloy powder at the ratio of (100−H)wt %:Hwt %, to be mixed;
aligning and compacting the mixed powder in a magnetic field, to be magnetized;
loading the magnetized mixture powder into a heating furnace and diffusing a heavy rare earth element to a grain boundary of the rare earth alloy under a vacuum or in an inert gas atmosphere;
sintering the alloy powder with the diffused heavy rare earth element; and
performing a heat treatment to the sintered alloy.

In the method for manufacturing a rare earth sintered magnet according to the present invention, the heavy rare earth compound is one of the compounds which are Gd-Hydride, Gd-Fluoride, Gd-Oxide, Gd-Oxyfluoride, Nd-Hydride, Ho-Fluoride, Ho-Hydride, Dy-Hydride, Dy-Fluoride, Tb-Hydride and Tb-Fluoride as powders.

The heavy rare earth metal alloy is one of the alloys which are Gd—Al, Gd—Cu and Gd—Ag.

The heavy rare earth compound powder of 40~60 wt % is mixed with the heavy rare earth metal alloy powder of 40~60 wt %.

The heavy rare earth compound powder is a mixture of one or more of the compound which are Gd-Hydride, Gd-Fluoride, Gd-Oxide and Gd-Oxyfluoride as powders and one or more of the compounds which are Nd-Hydride, Ho-Fluoride, Ho-Hydride, Dy-Hydride, Dy-Fluoride, Tb-Hydride and Tb-Fluoride as powders.

The heavy rare earth compound powder is the mixture of one or more of the powders which are Gd-Hydride, Gd-Fluoride, Gd-Oxide and Gd-Oxyfluoride of 40~60 wt % and one or more of the powders which are Nd-Hydride, Ho-Fluoride, Ho-Hydride, Dy-Hydride, Dy-Fluoride, Tb-Hydride and Tb-Fluoride of 40~60 wt %.

In the rare earth alloy composed of xwt % RE-ywt % B-zwt % TM-bal.wt % Fe (RE is a rare earth element, TM is a 3d transition element, x=28~35, y=0.5~1.5 and z=0~15), the RE includes one or more of the rare earth metals which are Nd, Pr, La, Ce, Ho, Dy and Tb.

In the rare earth alloy composed of xwt % RE-ywt % B-zwt % TM-bal.wt % Fe (RE is a rare earth element, TM is a 3d transition element, x=28~35, y=0.5~1.5 and z=0~15), the TM includes one or more of the 3d transition elements which are Co, Cu, Al, Ga, Nb, Ti, Mo, V, Zr and Zn.

In the rare earth alloy composed of xwt % RE-ywt % B-zwt % TM-bal.wt % Fe (RE is a rare earth element, TM is a 3d transition element, x=28~35, y=0.5~1.5 and z=0~15), the x is within a range of 28~35, y within a range of 0.5~1.5 and z is with in a range of 0~15.

In the step of diffusing the heavy rare earth element to the grain boundary of the rare earth alloy, the diffusion process is performed at 700~800° C. for 1~10 hours, preferably, at 700~800° C. for 1.5~2.5 hours.

After the grain boundary diffusion process, the sintering process is performed at 900~1,200° C. for 0.5~3 hours under a vacuum or in an argon atmosphere, etc., preferably, at 1,000~1,100° C. for 1~2.5 hours.

After the sintering process, the final heat treatment is performed at 400~600° C. for 0.5~3 hours, preferably, at 450~550° C. for 1.5~2.5 hours.

Advantageous Effects

As described above, in accordance with the method for manufacturing a rare earth sintered magnet of the present invention, the temperature coefficient of residual magnetic flux density and the coercivity, which are magnetic characteristics according to the temperature of the Nd—Fe—B sintered magnet, are increased by uniformly distributing a mixture of a heavy rare earth compound or heavy rare earth metal alloy and a rare earth magnet powder to the surface of the magnet and the grain boundary inside of the magnet, such that the heavy rare earth metal of Gd or the heavy rare earth metals from the mixtures of Gd and Nd, Gd and Ho, Gd and Dy and/or Gd and Tb are diffused to the grain boundary.

DESCRIPTION OF DRAWINGS

The above and other features and advantages of the present invention will become more apparent by describing in detail exemplary embodiments thereof with reference to the attached drawing(s) in which.

MODE FOR INVENTION

Figure 1:
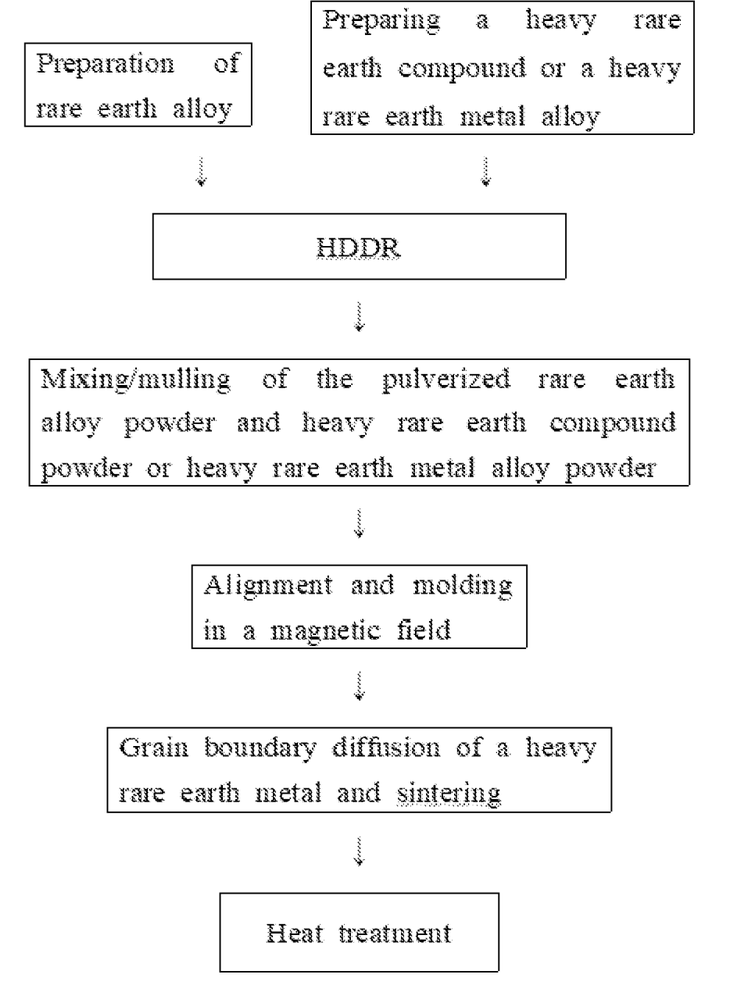
FIG. 1 is a flow chart illustrating a process of a method for manufacturing a rare earth sintered magnet according to the present invention.

The present invention will now be described more fully hereinafter with reference to the accompanying drawing(s), in which preferred embodiments of the invention are shown.

[Manufacturing Method]

(1) Step of Preparing a Rare Earth Alloy Powder

A raw material powder is prepared as a powder of a rare earth alloy. When the rare earth alloy(s) is composed of at least one selected from the rare earth elements (RE=Nd, Pr, La, Ce, Ho, Dy and Tb), Fe, at least one selected from the 3d transition elements (TM=Co, Cu, Al, Ga, Nb, Ti, Mo, V, Zr and Zn) and/or B, an RE-Fe alloy, an RE-Fe-TM alloy, an RE-Fe—B alloy and an RE-Fe-TM-B alloy are obtained. More specifically, the rare earth alloys are an Nd—Fe—B alloy, an Nd—Fe—Co alloy, an Nd—Fe—Co—B alloy, etc. The powders composed of the rare earth alloys, which are publicly known to be used for a rare earth sintered magnet, can be used as the raw material powders.

The raw material powder is the alloy composed of xwt % RE-ywt % B-zwt % TM-bal.wt % Fe (RE is a rare earth element, TM is a 3d transition element, x=28~35, y=0.5~1.5 and z=0~15).

The raw material powder formed of the alloy having a desired composition is manufactured by pulverizing a foil, which is obtained by melting and casting an ingot or a rapid solidification method, by a pulverizing device such as a jet mill, attribution mill, ball mill, Attritor grinding mill, ball mill, vibration mill, etc. or by an atomizing method such as a gas atomizing method. The powder which is obtained by the publicly known method for manufacturing a powder or which is manufactured by the atomizing method may be further pulverized for use. The particle-size distribution of the raw material powder or the shape of each particle forming the powder is adjustable by properly changing the pulverizing conditions and manufacturing conditions. Although the shape of the particle does not particularly matter, the closer it is to a sphere, the easier it is to get densification, and it is easy for the particle to rotate by application of a magnetic field. In the case of using the atomizing method, the powder with a high sphericalness can be obtained.

In the process of coarsely pulverizing the manufactured alloy strip, the strip is loaded into a vacuum furnace for vacuum-exhaust and then maintained for 2 hours or more in a hydrogen atmosphere at room temperature so that hydrogen is absorbed into the strip. Subsequently, the strip is heated at 600° C. under a vacuum to remove the hydrogen which is present in the strip. (hydrogenation-disproportionation-desorption-recombination (HDDR) process)

The HDDR-processed and coarsely pulverized powder is prepared as a uniform and fine powder with an average particle diameter of 1~5.0 μm by the pulverizing method using the jet mill technique in a nitrogen or inert gas atmosphere.

The finer the raw material powder is, the more easily the packing density is increased. Thus, the maximum particle diameter is preferably equal to or smaller than 5.0 μm.

(2) Step of preparing a heavy rare earth compound powder or a heavy rare earth metal alloy powder Separately from the rare earth alloy powder, a heavy rare earth compound powder or a heavy rare earth metal alloy powder is prepared.

(3) Step of mixing the heavy rare earth compound powder and the rare earth alloy powder The prepared rare earth alloy powder of (100−H)wt % and the prepared heavy rare earth compound powder or heavy rare earth metal alloy powder of Hwt % are mulled to be mixed.

As shown in the Examples to be later described, the content ratio of the rare earth alloy powder and the heavy rare earth compound powder, or the content ratio of the rare earth alloy powder and the heavy rare earth metal alloy powder is good within the range of 98-99 wt %: 1-2 wt %.

As one example of a mulling method, after a mixing ratio is measured, the mixture of the powders is uniformly mulled for 0.5~5 hours by using a 3D powder mixer. To uniformly mull the rare earth alloy powder and the heavy rare earth compound powder or heavy rare earth metal alloy powder, an average particle diameter of the heavy rare earth compound powder or heavy rare earth metal alloy powder is equal to or smaller than 5 μm, preferably 4 μm, more preferably 3 μm. If the diameter is too large, it is difficult to be alloyed with a matrix structure and trouble occurs in adhesion to the matrix structure of the surface layer to be formed. As the diameter is smaller, the surface layer of high density is formed after heating. A small diameter is better even to use the surface layer as a corrosion-protective layer. Therefore, there is no specific lower limit of the diameter. If costs are not considered, super fines of tens-of nanometers (nm) is ideal but the practically most preferable average particle diameter of the metal powders is about 0.3~3 μm.

The mixing process is performed in a nitrogen or inert gas atmosphere, to prevent the deterioration of magnetic characteristics by contamination of oxygen.

The heavy rare earth compound powder is one of the compound powders, Gd-Hydride, Gd-Fluoride, Gd-Oxide, Gd-Oxyfluoride, Nd-Hydride, Ho-Fluoride, Ho-Hydride, Dy-Hydride, Dy-Fluoride, Tb-Hydride and Tb-Fluoride.

The heavy rare earth compound powder may be composed of either the Gd compound powder only or a mixture of the Gd compound powder and one or more of the compound powders, Nd-Hydride, Ho-Fluoride, Ho-Hydride, Dy-Hydride, Dy-Fluoride, Tb-Hydride and Tb-Fluoride.

The Gd compound may be Gd-Hydride.

The heavy rare earth metal alloy may be one of a Gd—Al alloy, Gd—Cu alloy and Gd—Ag alloy.

The mixture of one or more of the Gd compound powders or Gd metal alloy powders and one or more of the compound powders, Nd-Hydride, Ho-Fluoride, Ho-Hydride, Dy-Hydride, Dy-Fluoride, Tb-Hydride and Tb-Fluoride may be used.

The heavy rare earth compound powder contains hydrogen (H), fluorine (F) and oxygen (O) in the form of a compound, which are separated and released upon heating for the grain boundary diffusion process to be described later. The gas, such as the released hydrogen, etc., may contribute to reduce a powder particle size. The heavy rare earth elements, Gd, Nd, Ho, Dy and Tb, are released by heating, to be diffused to the grain boundary.

The Gd, which is in a solid solution in the Gd—Al alloy, Gd—Cu alloy and Gd—Ag alloy, is released by heating, to be diffused to the grain boundary.

(4) Step of Compacting in a Magnetic Field

A mold in a desired shape and size is prepared to obtain a compact of the mulled rare earth alloy powder and heavy rare earth compound powder or a compact of the mulled rare earth alloy powder and heavy rare earth metal alloy powder in the desired shape and size. A mold, which is used to manufacture the powder compact used as a material of the conventional sintered magnet and typically comprises a die, an upper punch and a lower punch, may be used. Otherwise, a cold isostatic press can be used.

When a mold is filled with the raw material powder, the powder is completely aligned in a high magnetic field, which is generated by applying pulsed current to electromagnets positioned at the right and left of the mold, in a nitrogen atmosphere. Subsequently, compacting is performed simultaneously while maintaining the orientation of the powder which has been already completely aligned by a DC magnetic field generated by applying direct current, to manufacture the compact.

(5) Step of Diffusing the Heavy Rear Earth and Sintering

The present invention is to improve the coercivity and the temperature characteristics of the residual magnetic flux density by adding a small amount of Gd. When Gd is added to the RE-Fe—B-based alloy, the Curie temperature rises to improve the temperature coefficient of the residual magnetic flux density. When a small amount (about 1%) of Gd is added, the coercivity increases and when Gd is added in a greater amount than that, the coercivity shows a tendency of decreasing.

Thus, the present invention is to improve the temperature coefficient of the residual magnetic flux density and the coercivity simultaneously, by adding a small amount of Gd by using the grain boundary diffusion process.

In the step for the grain boundary diffusion, the compact obtained by compacting in a magnetic field is loaded into a heating furnace and sufficiently maintained at 400° C. or below, under a vacuum, so that the remaining impure organic matters are completely removed.

Sequentially, the heavy rare earth diffusing and sintering processes are simultaneously performed in the heating furnace. For the diffusion of the heavy rare earth element, a heat treatment temperature and a heating rate are very important. The temperature is 700~900° C. and the maintenance time is 1~10 hours.

The above-described heating makes it easy to perform the grain boundary diffusion method and therefore the high characterization of the sintered magnet, namely, the residual magnetic flux density (Br) or the maximum energy product ((BH)max), is maintained to be higher before the grain boundary diffusion process is performed and the coercivity (Hcj) is high. As reported, the grain boundary diffusion method has a great effect for a thin magnet and it is specially effective for a thickness which is equal to or smaller than 5 mm.

To increase the diffusion effect of the heavy rare earth element, the heating rate is adjusted within the range of 0.5~15° C./min, at 700° C. or above, such that the heavy rare earth element can be uniformly diffused to the grain boundary.

It is better to perform the step of diffusing the heavy rare earth element under a vacuum and in an inert gas, like argon, etc., atmosphere.

After that, the sintering process is again performed under the sintering conditions of a temperature of 900~1,200° C., for 0.5~3 hours, under a vacuum or in an argon atmosphere, etc., preferably, at 1,000~1,100° C. for 1~2.5 hours.

The present invention will be more specifically described with reference to the examples below:

Example 1

In Example 1, an alloy composed of xwt % RE-ywt % B-zwt % TM-bal.wt % Fe (wherein RE is a rare earth element, TM is a 3d transition element, x=28~35, y=0.5~1.5 and z=0~15) was melted in an argon atmosphere by an induction heating method and subsequently was rapidly cooled by a strip casting method, to prepare an alloy strip.

In the process of coarsely pulverizing the prepared alloy strip, the alloy strip was loaded into a vacuum furnace for vacuum-exhaust and then maintained in a hydrogen atmosphere for 2 hours or more, to allow hydrogen to be absorbed into the alloy strip. Subsequently, the alloy strip was heated at 600° C. under a vacuum, to remove hydrogen present in the alloy strip. The HDDR-processed and coarsely pulverized powder was as a uniform and fine powder with an average particle diameter of 1~5.0 μm by a pulverizing method using the jet mill technique. The process of preparing the alloy strip as the fine powder was performed in a nitrogen or inert gas atmosphere, to prevent the deterioration of magnetic characteristics by contamination of oxygen.

Separately from the rare earth alloy powder, a heavy rare earth compound powder of Gd-Hydride was prepared.

The ratio of the pulverized rare earth alloy powder to the Gd-Hydride compound powder was measured to be at 99.0 wt %:1.0 wt %. The measured rare earth alloy powder and Gd-Hydride compound powder were uniformly mulled for 2 hours by using a dry mulling technique (3D powder mixer). The particle size of the Gd-Hydride compound powder as used was 1 μm.

A compacting process in a magnetic field was performed using the mulled powder as follows: When a mold was filled with the rare earth powder in a nitrogen atmosphere, the rare earth powder was aligned to a uniaxial direction by applying a DC magnetic field by electromagnets positioned at the right and left of the mold and was compacted by applying pressure of upper and lower punches simultaneously, to make a compact.

The compact obtained by the compacting method in a magnetic field was loaded into a vacuum heating furnace and slowly heated and maintained at 700~900° C. for 2 hours, under a vacuum, so that the melt Gd-Hydride compound was uniformly diffused to permeate to the grain boundary of the rare earth alloy powder. Subsequently, the sintering densification process was performed at 1,040° C. for 2 hours and then the sintered compact was heat-treated at 500° C. for 2 hours.

After the sintered compact was prepared by the above-described sintering process, the sintered compact was processed as a magnet of 12.5*12.5*5 mm in size.

Table 1 shows the evaluation results of magnetic characteristics of the magnets manufactured by using the rare earth alloy powder composed of xwt % Nd-1 wt % B-2 wt % TM-bal.wt % Fe (wherein TM=Cu, Al, Nb, Co, x=30~34) and using the Gd-Hydride as the material to be mulled during the powder mulling process, and then compacted in a magnetic field and sintered.

TABLE 1

| Sample preparation conditions | x | Mulled material 1 | Amount of mulled material 1 (wt %) | Residual magnetic flux density, Br (kG) | Coercivity, Hcj (kOe) | Br decrease rate based on temperature (%/° C.) | Hcj decrease rate based on temperature (%/° C.) |
|---|---|---|---|---|---|---|---|
| Comparative example | 32 | | | 13.5 | 14.5 | −0.120 | −0.65 |
| Example 1-1 | 30 | Gd-Hydride | 1.0 | 13.8 | 14.8 | −0.082 | −0.65 |
| Example 1-2 | 31 | Gd-Hydride | 1.0 | 13.6 | 15.2 | −0.081 | −0.65 |
| Example 1-3 | 32 | Gd-Hydride | 1.0 | 13.4 | 15.8 | −0.082 | −0.65 |
| Example 1-4 | 33 | Gd-Hydride | 1.0 | 13.2 | 16.2 | −0.081 | −0.65 |
| Example 1-5 | 34 | Gd-Hydride | 1.0 | 13.0 | 16.8 | −0.085 | −0.65 |

The comparative example shows the room temperature magnetic characteristics and the temperature characteristics of a magnet in which any heavy rare earth element was not mulled. Examples 1-1 through 1-5 show the room temperature magnetic characteristics and the temperature characteristics of magnets after the grain boundary diffusion was performed, each magnet wherein a mass ratio of Nd was different in the composition ratio of xwt % Nd-1 wt % B-2 wt % TM-bal.wt % Fe and the Gd-Hydride powder was mulled to be diffused to the grain boundary.

As observation results, when Gd was diffused to the grain boundary of each of the permanent magnets composed of xwt % Nd-1 wt % B-2 wt % TM-bal.wt % Fe, it was confirmed that the coercivity was increased at room temperature and the absolute value of the decrease rate of the residual magnetic flux density based on temperature was lowered.

The point that the decrease rate of the residual magnetic flux density based on temperature is minus means that the characteristics based on temperature decreases, and the point that the absolute value lowers means that the decrease of performance based on temperature is reduced.

Accordingly, it is confirmed that when the heavy rare earth element, Gd, is diffused to the grain boundary of the permanent magnet composed of xwt % Nd-1 wt % B-2 wt % TM-bal.wt % Fe, the temperature characteristics are improved and the coercivity at room temperature is improved.

Example 2

In Example 2, an alloy composed of 32 wt % RE-1 wt % B-2 wt % TM-bal.wt % Fe (wherein RE is a rare earth element, TM is a 3d transition element) was melted, in an argon atmosphere, by an induction heating method and subsequently was rapidly cooled by a strip casting method, to prepare an alloy strip.

In the process of coarsely pulverizing the prepared alloy strip, the alloy strip was loaded into a vacuum furnace for vacuum-exhaust and then maintained in a hydrogen atmosphere for 2 hours or more, to allow hydrogen to be absorbed into the alloy strip. Subsequently, the alloy strip was heated at 600° C. under a vacuum, to remove hydrogen present in the alloy strip. The HDDR-processed and coarsely pulverized powder was prepared as a uniform and fine powder with an average particle diameter of 1~5.0 μm by a pulverizing method using the jet mill technique. The process of preparing the alloy strip as the fine powder was performed in a nitrogen or inert gas atmosphere, to prevent the deterioration of magnetic characteristics by contamination of oxygen.

Separately from the rare earth alloy powder, a heavy rare earth compound powder of Gd-Hydride or Gd-Fluoride and a heavy rare earth metal alloy powder of Gd—Al, Gd—Cu or Gd—Ag were prepared.

The ratio of the pulverized rare earth alloy powder to the heavy earth compound powder of Gd-Hydride or Gd-Fluoride or the ratio of the pulverized rare earth alloy powder to the heavy rare earth metal alloy powder of Gd—Al, Gd—Cu or Gd—Ag was measured to be at 99.0 wt %:1.0 wt %. The measured rare earth alloy powder and heavy earth compound powder of Gd-Hydride or Gd-Fluoride, or the measured rare earth alloy powder and heavy rare earth metal alloy powder of Gd—Al, Gd—Cu or Gd—Ag were uniformly mulled for 2 hours by using a dry mulling technique (3D powder mixer). The particle size of the heavy earth compound powders of Gd-Hydride and Gd-Fluoride and the heavy rare earth metal alloy powders of Gd—Al, Gd—Cu and Gd—Ag as used was 3 μm.

A compacting process in a magnetic field was performed using the mulled powder as follows: When a mold was filled with the rare earth powder in a nitrogen atmosphere, the rare earth powder was aligned to a uniaxial direction by applying a DC magnetic field by electromagnets positioned at the right and left of the mold and was compacted by applying pressure of upper and lower punches simultaneously, to make a compact.

The compact obtained by the compacting method in a magnetic field was loaded into a vacuum heating furnace and slowly heated at 700~900° C. for 2 hours, under a vacuum, so that the melt heavy earth compounds, Gd-Hydride and Gd-Fluoride, and heavy rare earth metal alloys, Gd—Al, Gd—Cu and Gd—Ag, were uniformly diffused to permeate to the grain boundaries of the rare earth alloy powder. Subsequently, the sintering densification process was performed at 1,040° C. for 2 hours and then the sintered compact was heat-treated at 500° C. for 2 hours.

After the sintered compact was prepared by the above-described sintering and manufacturing process, the sintered compact was processed as a magnet of 12.5*12.5*5 mm in size.

Table 2 shows the evaluation results of magnetic characteristics of the magnets manufactured by using the rare earth alloy powder composed of 32 wt % Nd-1 wt % B-2 wt % TM-bal.wt % Fe (wherein TM=Cu, Al, Nb, Co) and respectively using the Gd-Hydride compound powder, Gd-Fluoride compound powder, and the Gd—Al, Gd—Cu and Gd—Ag alloy powders as the materials to be mulled, then compacted in a magnetic field and diffused to the grain boundaries and sintered.

TABLE 2

| Sample preparation conditions | Process conditions | | | Magnetic characteristics at room temperature | | Temperature characteristics | |
|---|---|---|---|---|---|---|---|
| | Mulled material 1 | Amount of mulled material 1 (wt %) | Sintering conditions | Residual magnetic flux density, Br (kG) | Coercivity, Hcj (kOe) | Br decrease rate based on temperature (%/° C.) | Hcj decrease rate based on temperature (%/° C.) |
| Comparative example | | | | 13.5 | 14.5 | −0.120 | −0.65 |
| Example 1-3 | Gd-Hydride | 1.0 | 1,040° C. 2 hours | 13.4 | 15.8 | −0.082 | −0.65 |
| Example 2-1 | Gd-Fluoride | 1.0 | 1,040° C. 2 hours | 13.4 | 15.2 | −0.086 | −0.65 |
| Example 2-2 | Gd—Al | 1.0 | 1,040° C. 2 hours | 13.4 | 15.1 | −0.084 | −0.65 |
| Example 2-3 | Gd—Cu | 1.0 | 1,040° C. 2 hours | 13.4 | 15.2 | −0.084 | −0.65 |
| Example 2-4 | Gd—Ag | 1.0 | 1,040° C. 2 hours | 13.4 | 15.2 | −0.087 | −0.65 |

In Table 2, the comparative example shows the room temperature magnetic characteristics and temperature characteristics of the magnet in which any heavy rare earth element was not diffused to the grain boundary. Example 1-3 shows the room temperature magnetic characteristics and the temperature characteristics of the magnet composed of 32 wt % Nd-1 wt % B-2 wt % TM-bal.wt % Fe, wherein the Gd-Hydride powder was mulled to be diffused to the grain boundary.

Examples 2-1 through 2-4 show the room temperature magnetic characteristics and the temperature characteristics of the magnets composed of 32 wt % Nd-1 wt % B-2 wt % TM-bal.wt % Fe, wherein the Gd-Fluoride compound powder, Gd—Al alloy powder, Gd—Cu alloy powder and Gd—Ag alloy powder were respectively mulled with the rare earth alloy powder, then compacted in a magnetic field, diffused to the grain boundaries and sintered.

As observation results, when Gd was diffused to the grain boundary of each of the permanent magnets composed of 32 wt % Nd-1 wt % B-2 wt % TM-bal.wt % Fe, it was confirmed that the coercivity was increased at room temperature and the absolute value of the decrease rate of the residual magnetic flux density based on temperature was lowered.

The point that the decrease rate of the residual magnetic flux density based on temperature is minus means that the characteristics based on temperature decreases, and the point that the absolute value lowers means that the decrease of performance based on temperature is reduced.

Accordingly, it is confirmed that when the heavy rare earth element, Gd, is diffused to the grain boundary of the permanent magnet composed of 32 wt % Nd-1 wt % B-2 wt % TM-bal.wt % Fe, the magnetic characteristics based on temperature are improved and the coercivity at room temperature is improved.

Example 3

In Example 3, an alloy composed of 32 wt % RE-1 wt % B-2 wt % TM-bal.wt % Fe (wherein RE is a rare earth element, TM is a 3d transition element) was melted, in an argon atmosphere, by an induction heating method and subsequently was rapidly cooled by a strip casting method, to prepare an alloy strip.

In the process of coarsely pulverizing the prepared alloy strip, the alloy strip was loaded into a vacuum furnace for vacuum-exhaust and then maintained in a hydrogen atmosphere for 2 hours or more, to allow hydrogen to be absorbed into the alloy strip. Subsequently, the alloy strip was heated at 600° C. under a vacuum, to remove hydrogen present in the alloy strip. The HDDR-processed and coarsely pulverized powder was prepared as a uniform and fine powder with an average particle diameter of 1~5.0 μm by a pulverizing method using the jet mill technique. The process of preparing the alloy strip as the fine powder was performed in a nitrogen or inert gas atmosphere, to prevent the deterioration of magnetic characteristics by contamination of oxygen.

Separately from the rare earth alloy powder, a mixture of a heavy rare earth compound powder of Gd-Hydride and a heavy rare earth metal alloy powder of Nd-Hydride, Ho-Hydride, Dy-Hydride or Tb-Hydride was prepared.

The ratio of the pulverized rare earth alloy powder to a mixture of the heavy earth compound powder of Gd-Hydride and the heavy rare earth compound powder of Nd-Hydride, Ho-Hydride, Dy-Hydride or Tb-Hydride, was measured to be at 99.0 wt %:1.0 wt %. The measured rare earth alloy powder and the measure mixture of the heavy earth compound powder of Gd-Hydride and the heavy rare earth metal alloy powder of Nd-Hydride, Ho-Hydride, Dy-Hydride or Tb-Hydride were uniformly mulled for 2 hours by using a dry mulling technique (3D powder mixer). The particle size of the mixture of the heavy earth compound powder of Gd-Hydride and heavy rare earth metal alloy powder of Nd-Hydride, Ho-Hydride, Dy-Hydride or Tb-Hydride as used was 3 μm.

A compacting process in a magnetic field was performed using the mulled powder as follows: When a mold was filled with the rare earth powder in a nitrogen atmosphere, the rare earth powder was aligned to a uniaxial direction by applying a DC magnetic field by electromagnets positioned at the right and left of the mold and was compacted by applying pressure of upper and lower punches simultaneously, to make a compact.

The compact obtained by the compacting method in a magnetic field was loaded into a vacuum heating furnace to be slowly heated and maintained at 700~900° C. for 2 hours, under a vacuum, so that the melted heavy earth compound of Gd-Hydride and heavy rare earth metal alloy of Nd-Hydride, Ho-Hydride, Dy-Hydride or Tb-Hydride was uniformly diffused to permeate to the grain boundary of the rare earth alloy powder. Subsequently, the sintering densification process was performed at 1,040° C. for 2 hours and then the sintered compact was heat-treated at 500° C. for 2 hours.

After the sintered compact was prepared by the above-described sintering and manufacturing process, the sintered compact was processed as a magnet of 12.5*12.5*5 mm in size.

Table 3 shows evaluation results of magnetic characteristics of the magnets manufactured by using the rare earth alloy powder composed of 32 wt % Nd-1 wt % B-2 wt % TM-bal.wt % Fe (wherein TM=Cu, Al, Nb, Co) and respectively using the mixtures of the powders, Gd-Hydride and Nd-Hydride, Gd-Hydride and Ho-Hydride, Gd-Hydride and Dy-Hydride, and Gd-Hydride and Tb-Hydride as the materials to be mulled, then compacted in a magnetic field, diffused to the grain boundaries and sintered.

As observation results, when the mixture of the heavy rare earth elements, Gd and Nd, Gd and Ho, Gd and Dy, or Gd and Tb, was diffused to the grain boundary of the magnet composed of 32 wt % Nd-1 wt % B-2 wt % TM-bal.wt % Fe, it was confirmed that the coercivity was increased at room temperature and the absolute value of the decrease rate of the residual magnetic flux density based on temperature was lowered.

The point that the decrease rate of the residual magnetic flux density based on temperature is minus means that the characteristics based on temperature decreases, and the point that the absolute value lowers means that the decrease of performance based on temperature is reduced.

Accordingly, it is confirmed that when the heavy rare earth element mixtures of Gd and Nd, Gd and Ho, Gd and Dy, and Gd and Tb were diffused to the grain boundaries of the permanent magnets composed of 32 wt % Nd-1 wt % B-2 wt % TM-bal.wt % Fe, the magnetic characteristics based on temperature are improved and the coercivity at room temperature is improved.

While the present invention has been particularly shown and described with reference to examples thereof, it will be understood by those of ordinary skill in the art that various modifications and alternative arrangements in form and details may be made therein without departing from the spirit and scope of the present invention as defined by the following claims. The scope of the claims, therefore, should be accorded the broadest interpretation so as to encompass all such modifications and similar arrangements. For example, the compositions of the raw material powders, the

TABLE 3

| Sample preparation conditions | Process conditions | | | Magnetic characteristics at room temperature | | Temperature characteristics | |
|---|---|---|---|---|---|---|---|
| | Mulled material 1 | Mulled material 2 | Mulled material 1: Mulled material 2 | Residual magnetic flux density, Br (kG) | Coercivity, Hcj (kOe) | Br decrease rate based on temperature (%/° C.) | Hcj decrease rate based on temperature (%/° C.) |
| Example 1-3 | Gd-Hydride | | | 13.4 | 15.8 | −0.082 | −0.65 |
| Example 3-1 | Gd-Hydride | Nd-Hydride | 1:1 | 13.4 | 16.1 | −0.079 | −0.65 |
| Example 3-2 | Gd-Hydride | Ho-Hydride | 1:1 | 13.4 | 17.2 | −0.076 | −0.59 |
| Example 3-3 | Gd-Hydride | Dy-Hydride | 1:1 | 13.4 | 19.8 | −0.068 | −0.52 |
| Example 3-4 | Gd-Hydride | Tb-Hydride | 1:1 | 13.4 | 23.3 | −0.060 | −0.46 |

In Table 3, Example 1-3 shows the room temperature magnetic characteristics and the temperature characteristics of the magnet having the composition ratio of 32 wt % Nd-1 wt % B-2 wt % TM-bal.wt % Fe, wherein the Gd-Hydride powder was mulled to be diffused to the grain boundary.

Examples 3-1 through 3-4 show the room temperature magnetic characteristics and the temperature characteristics of the magnets composed of 32 wt % Nd-1 wt % B-2 wt % TM-bal.wt % Fe, wherein the mixtures of the Gd-Hydride and Nd-Hydride, Gd-Hydride and Ho-Hydride, Gd-Hydride and Dy-Hydride, and Gd-Hydride and Tb-Hydride compound powders, each mixture mixed at 1:1, were mulled, then compacted in a magnetic field, diffused to the grain boundaries and sintered.

shape or size of the compact, the rate of applying a magnetic field, the sintering conditions, etc. may be properly modified.

The invention claimed is:

1. A method for manufacturing a rare earth sintered magnet comprising the steps of:

preparing a rare earth alloy composed of xwt % RE-ywt % B-zwt % TM-bal.wt % Fe, wherein RE is a rare earth element, TM is a 3d transition element, $x=28\sim35$, $y=0.5\sim1.5$, $z=0\sim15$, and pulverizing the prepared rare earth alloy to a size of $1.0\sim5.0$ μm;

preparing heavy rare earth compounds and a heavy rare earth metal alloy and pulverizing the heavy rare earth compounds and the heavy rare earth metal alloy to a size of 1.0~5.0 μm;

mixing the heavy rare earth compound powder of 40~60 wt % with the heavy rare earth metal alloy powder of 40~60 wt %;

mulling the pulverized rare earth alloy powder and the heavy rare earth compound powder and the heavy rare earth metal alloy powder at a ratio of 98-99 wt % pulverized rare earth alloy powder: 1-2 wt % heavy rare earth compound powder and heavy rare earth metal alloy powder, to be mixed;

aligning and compacting the mixed powder in a magnetic field, to be magnetized;

loading the magnetized mixture powder into a heating furnace and diffusing heavy rare earth elements of the heavy rare earth compounds and the heavy rare earth metal alloy to a grain boundary of the rare earth alloy under a vacuum or in an inert gas atmosphere;

sintering the powder of the rare earth alloy with the diffused heavy rare earth elements; and performing a heat treatment to the sintered alloy, wherein the heavy rare earth compounds are Gd-Hydride and one of the compounds which are Ho-Hydride, Dy-Hydride and Tb-Hydride as powders, and wherein the heavy rare earth metal alloy is one of the alloys which are Gd-Al, Gd-Cu and Gd-Ag.

\* \* \* \* \*